United States Patent
Chiang et al.

(10) Patent No.: US 6,844,691 B2
(45) Date of Patent: Jan. 18, 2005

(54) VENTILATOR HAVING AN ABNORMAL OPERATION INDICATION DEVICE

(76) Inventors: Chao-Cheng Chiang, 335, Ta Lin Rd., Ta Ya Hsiang, Taichung Hsien (TW); Chi-Hsiung Chiang, 335, Ta Lin Rd., Ta Ya Hsiang, Taichung Hsien (TW)

( * ) Notice: Subject to any disclaimer, the term of this patent is extended or adjusted under 35 U.S.C. 154(b) by 71 days.

(21) Appl. No.: 10/336,775

(22) Filed: Jan. 2, 2003

(65) Prior Publication Data

US 2004/0130280 A1 Jul. 8, 2004

(51) Int. Cl.[7] ............................................. H02P 7/00
(52) U.S. Cl. ............................ 318/268; 318/55; 318/59; 318/257; 318/471; 318/786; 318/800; 236/49.1; 236/49.2
(58) Field of Search ............................ 318/55, 59, 257, 318/268, 471–478, 64, 66, 771, 778, 786, 799, 800; 236/49.1, 49.2; 454/370

(56) References Cited

U.S. PATENT DOCUMENTS

| 3,646,439 | A | * | 2/1972 | Broski | 323/242 |
|---|---|---|---|---|---|
| 3,803,866 | A | * | 4/1974 | Barry | 62/230 |
| 3,826,180 | A | * | 7/1974 | Hayashi | 454/342 |
| 3,829,010 | A | * | 8/1974 | Jones | 236/49.3 |
| 4,189,094 | A | * | 2/1980 | Robinson | 236/46 R |
| 4,289,272 | A | * | 9/1981 | Murase et al. | 236/91 D |
| 4,378,760 | A | * | 4/1983 | Barge | 123/41.12 |
| 4,437,608 | A | * | 3/1984 | Smith | 236/13 |
| 4,671,124 | A | * | 6/1987 | Seliga | 73/862.53 |
| 4,722,019 | A | * | 1/1988 | Pohl | 361/22 |
| 4,977,363 | A | * | 12/1990 | Takada et al. | 318/771 |
| 5,021,932 | A | * | 6/1991 | Ivey | 362/96 |
| 5,049,801 | A | * | 9/1991 | Potter | 318/785 |
| 5,364,026 | A | * | 11/1994 | Kundert | 236/49.3 |
| 5,528,229 | A | * | 6/1996 | Mehta | 340/3.4 |
| 6,252,311 | B1 | * | 6/2001 | West | 307/29 |
| 6,709,111 | B2 | * | 3/2004 | Hirao et al. | 353/52 |

FOREIGN PATENT DOCUMENTS

GB          EP0545499 A1 *  1/1992  ........... H02P/7/622

* cited by examiner

Primary Examiner—David Martin
Assistant Examiner—Tyrone Smith
(74) Attorney, Agent, or Firm—Charles E. Baxley

(57) ABSTRACT

A ventilator having an abnormal operation indication device includes a power supply circuit, a central processing unit, a fan motor, and a load sensing circuit. Thus, the load sensing circuit detects the abnormal operation signals through the sensor, so that the abnormal operation indication lamp on the panel of the ventilator lights, so as to indicate that the part of the ventilator is disposed at an abnormal operation state and needs to be inspected and amended, thereby facilitating inspection and maintenance of the parts of the ventilator.

11 Claims, 2 Drawing Sheets

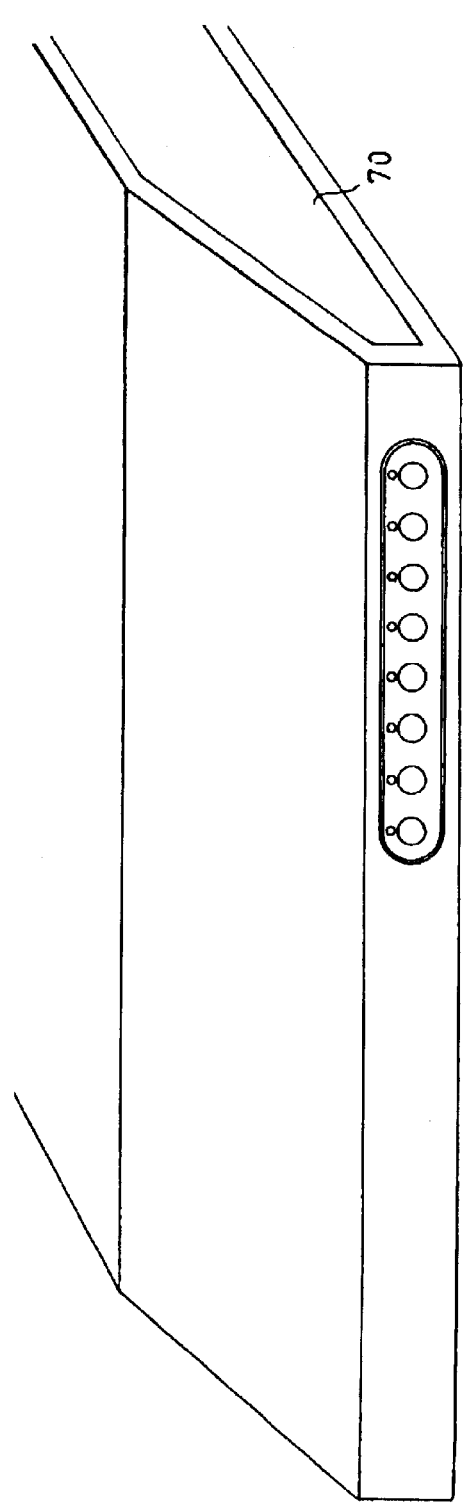
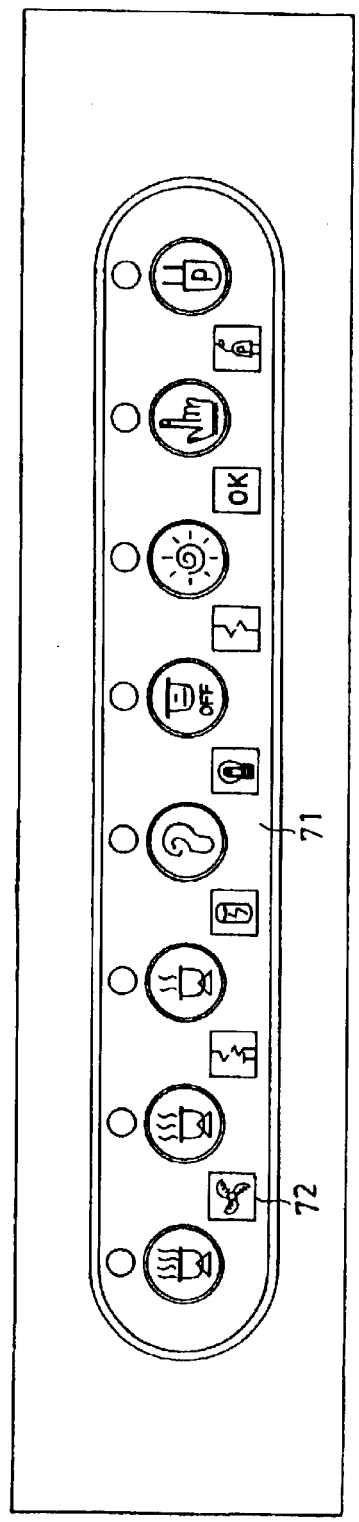

VENTILATOR HAVING AN ABNORMAL OPERATION INDICATION DEVICE

BACKGROUND OF THE INVENTION

1. Field of the Invention

The present invention relates to a ventilator having an abnormal operation indication device, and more particularly to a ventilator having an abnormal operation indication device, wherein the operation state of each part of the ventilator is indicated on the panel of the ventilator clearly, thereby facilitating inspection of the user, and thereby facilitating inspection and maintenance of the parts of the ventilator.

2. Description of the Related Art

The ventilator usually comprises a fan motor that is operated at a high rotational speed, so as to drain the oily smoke contained in the kitchen outward, thereby achieving the ventilating effect. However, when the rotational speed of the fan motor is increased, the temperature of the fan motor is increased relatively, so that the fan motor operated at a high rotational speed is easily worn out during a long-term utilization due to the high temperature.

A conventional ventilator in accordance with the prior art comprises a variable resistor to adjust the rotational speed of the fan motor by variation of the resistance of the variable resistor. However, the current is consumed by the variable resistor, thereby easily incurring overheat due to the improper variation of the resistance of the variable resistor, and thereby decreasing the lifetime of the fan motor.

SUMMARY OF THE INVENTION

The present invention has arisen to mitigate and/or obviate the disadvantage of the conventional ventilator.

The primary objective of the present invention is to provide a ventilator having an abnormal operation indication device, wherein the operation state of each part of the ventilator is indicated on the panel of the ventilator clearly, thereby facilitating inspection of the user, and thereby facilitating inspection and maintenance of the parts of the ventilator.

Another objective of the present invention is to provide a ventilator having an abnormal operation indication device, wherein the load sensing circuit detects the abnormal operation signal through the sensor, so that the abnormal operation indication lamp on the panel of the ventilator lights, so as to indicate that the part of the ventilator is disposed at an abnormal operation state and needs to be inspected and amended.

A further objective of the present invention is to provide a ventilator having an abnormal operation indication device, wherein the abnormal operation indication lamps on the panel of the ventilator are provided with different patterns or figures, so as to indicate the abnormal operation state of each part of the ventilator, so that the user can understand the related messages of each part of the ventilator easily and conveniently, thereby facilitating inspection and maintenance of the parts of the ventilator.

A further objective of the present invention is to provide a ventilator having an abnormal operation indication device, wherein the temperature sensing circuit can be used to detect the temperature of the fan motor during operation, and can feedback the detected temperature values to the central processing unit, so that the central processing unit can be used to control the rotational speed of the fan motor to a proper value, so as to reduce the output power and the rotational speed of the fan motor appropriately, thereby preventing the fan motor from being burnt out due to overheat.

A further objective of the present invention is to provide a ventilator having an abnormal operation indication device, wherein the temperature sensing circuit can detect the temperature of the fan motor during operation, and can reduce the rotational speed of the fan motor appropriately by using a voltage drop capacitor, without needing to use a variable resistor to adjust the rotational speed of the fan motor, thereby preventing from incurring overheat due to the improper variation of the resistance of the variable resistor, so as to enhance the lifetime of the fan motor.

A further objective of the present invention is to provide a ventilator having an abnormal operation indication device, wherein the temperature sensing circuit can be used to detect the temperature of multiple fan motors during operation, thereby enhancing the versatility of the ventilator.

In accordance with the present invention, there is provided a ventilator having an abnormal operation indication device, comprising a power supply circuit, a central processing unit, a fan motor, and a load sensing circuit, wherein:

the load sensing circuit is electrically connected to the power supply circuit, the central processing unit, the fan motor and the illumination lamp respectively, a first sensor is connected between the load sensing circuit and the power supply circuit, a second sensor is connected between the load sensing circuit and the fan motor, a third sensor is connected between the load sensing circuit and the illumination lamp, and a fourth sensor is connected between the load sensing circuit and a start capacitor of the fan motor.

Further benefits and advantages of the present invention will become apparent after a careful reading of the detailed description with appropriate reference to the accompanying drawings.

BRIEF DESCRIPTION OF THE DRAWINGS

FIG. 1 is a schematic perspective view of a ventilator having an abnormal operation indication device in accordance with a preferred embodiment of the present invention;

FIG. 1A is a partially plan enlarged view of the ventilator having an abnormal operation indication device as shown in FIG. 1.

DETAILED DESCRIPTION OF THE INVENTION

Figure 2:
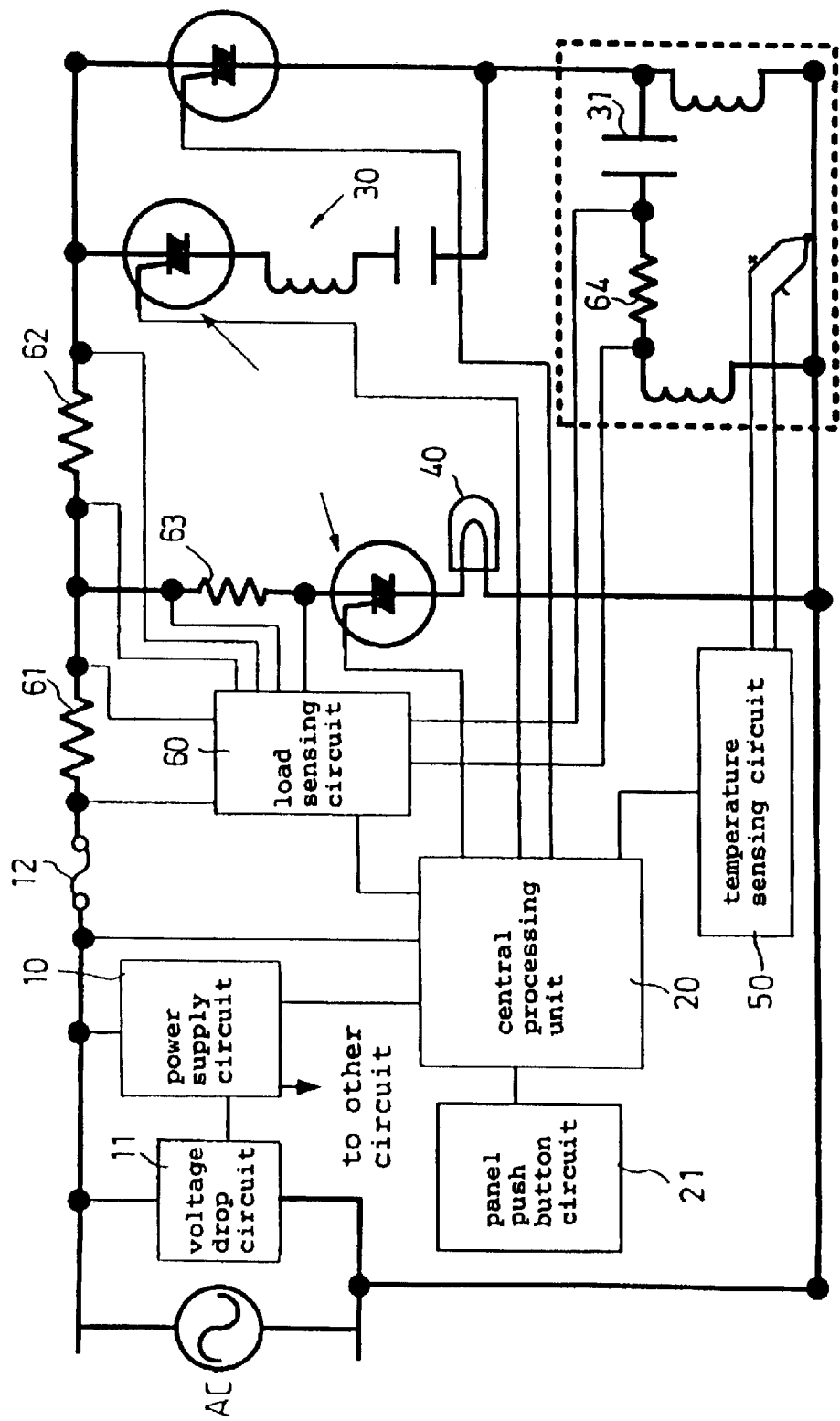
FIG. 2 is a schematic circuit diagram of the ventilator having an abnormal operation indication device in accordance with the preferred embodiment of the present invention.

Referring to FIGS. 1, 1A and 2, a ventilator having an abnormal operation indication device in accordance with a preferred embodiment of the present invention comprises a power supply circuit 10, a central processing unit (CPU) 20, a temperature sensing circuit 50, and a load sensing circuit 60.

The power supply circuit 10 is connected to a voltage drop circuit 11, so as to convert the alternating current power of the power supply circuit 10 into a direct current power supply. The power supply circuit 10 is connected to a safety member 12, such as a fuse.

The central processing unit 20 is connected to a panel push button circuit 21, so that the central processing unit 20 is controlled by the panel push button circuit 21. The central processing unit 20 is electrically connected to the power supply circuit 10. The central processing unit 20 can be used to control a fan motor 30 of the ventilator 70. The central processing unit 20 is connected to an illumination lamp 40.

The temperature sensing circuit 50 is connected to a start capacitor 31 of the fan motor 30, and is electrically connected to the central processing unit 20. Thus, the temperature sensing circuit 50 can be used to detect the temperature of the fan motor 30, and can feedback the detected values to the central processing unit 20, so that the central processing unit 20 can be used to control the rotational speed of the fan motor 30.

The load sensing circuit 60 is electrically connected to the power supply circuit 10, the central processing unit 20, the fan motor 30 and the illumination lamp 40 respectively. A first sensor 61 is connected between the load sensing circuit 60 and the safety member 12. A second sensor 62 is connected between the load sensing circuit 60 and the fan motor 30. A third sensor 63 is connected between the load sensing circuit 60 and the illumination lamp 40. A fourth sensor 64 is connected between the load sensing circuit 60 and the start capacitor 31 of the fan motor 30.

In operation, the central processing unit 20 can be used to control the ventilator 70 efficiently and safely. The user can control the panel 71 of the ventilator 70, so that the fan motor 30 of the ventilator 70 is operated, so as to drain the oily smoke contained in the kitchen outward, thereby achieving the ventilating effect.

In addition, the first sensor 61 is connected between the load sensing circuit 60 and the safety member 12, the second sensor 62 is connected between the load sensing circuit 60 and the fan motor 30, the third sensor 63 is connected between the load sensing circuit 60 and the illumination lamp 40, and the fourth sensor 64 is connected between the load sensing circuit 60 and the start capacitor 31 of the fan motor 30. In practice, the panel 71 of the ventilator 70 is provided with a plurality of abnormal operation indication lamps 72, so as to indicate the abnormal operation of the parts of the ventilator 70.

In such a manner, when the load sensing circuit 60 detects the abnormal operation signal through the first sensor 61, one of the abnormal operation indication lamps 72 on the panel 71 of the ventilator 70 lights, so as to indicate that the safety member 12 is disposed at an abnormal operation state and needs to be inspected and amended.

Alternatively, when the load sensing circuit 60 detects the abnormal operation signal through the second sensor 62, another of the abnormal operation indication lamps 72 on the panel 71 of the ventilator 70 lights, so as to indicate that the fan motor 30 is disposed at an abnormal operation state and needs to be inspected and amended.

Alternatively, when the load sensing circuit 60 detects the abnormal operation signal through the third sensor 63, another of the abnormal operation indication lamps 72 on the panel 71 of the ventilator 70 lights, so as to indicate that the illumination lamp 40 is disposed at an abnormal operation state and needs to be inspected and amended.

Alternatively, when the load sensing circuit 60 detects the abnormal operation signal through the fourth sensor 64, another of the abnormal operation indication lamps 72 on the panel 71 of the ventilator 70 lights, so as to indicate that the start capacitor 31 of the fan motor 30 is disposed at an abnormal operation state and needs to be inspected and amended.

In addition, the abnormal operation indication lamps 72 on the panel 71 of the ventilator 70 are provided with different patterns or figures, so as to indicate the abnormal operation state of each part of the ventilator 70, so that the user can understand the related messages of each part of the ventilator 70 easily and conveniently, thereby facilitating inspection and maintenance of the parts of the ventilator 70.

Further, when the rotational speed of the fan motor 30 is increased, the temperature of the fan motor 30 is increased relatively. At this time, the temperature sensing circuit 50 is connected to the fan motor 30, and is electrically connected to the central processing unit 20. Thus, the temperature sensing circuit 50 can be used to detect the temperature of the fan motor 30 during operation, and can feed back the detected temperature values to the central processing unit 20, so that the central processing unit 20 can be used to control the rotational speed of the fan motor 30 to a proper value, so as to reduce the output power and the rotational speed of the fan motor 30 appropriately, thereby preventing the fan motor 30 from being burnt out due to overheat.

Further, the temperature sensing circuit 50 can detect the temperature of the fan motor 30 during operation, and can reduce the rotational speed of the fan motor 30 appropriately by using a voltage drop capacitor, without needing to use a variable resistor to adjust the rotational speed of the fan motor 30, thereby preventing from incurring overheat due to the improper variation of the resistance of the variable resistor, so as to enhance the lifetime of the fan motor 30.

Further, the temperature sensing circuit 50 can be used to detect the temperature of multiple fan motors 30 during operation, thereby enhancing the versatility of the ventilator.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A ventilator having an abnormal operation indication device, comprising a power supply circuit, a central processing unit, a fan motor, and a load sensing circuit, wherein:

the load sensing circuit is electrically connected to the power supply circuit, the central processing unit, the fan motor and the illumination lamp respectively, a first sensor is connected between the load sensing circuit and the power supply circuit, a second sensor is connected between the load sensing circuit and the fan motor, a third sensor is connected between the load sensing circuit and the illumination lamp, and a fourth sensor is connected between the load sensing circuit and a start capacitor of the fan motor.

2. The ventilator having an abnormal operation indication device in accordance with claim 1, further comprising a temperature sensing circuit connected to the start capacitor of the fan motor and electrically connected to the central processing unit, wherein the temperature sensing circuit detects the temperature of the fan motor and feeds back detected values to the central processing unit, so that the central processing unit can be used to control a rotational speed of the fan motor.

3. The ventilator having an abnormal operation indication device in accordance with claim 1, wherein the power supply circuit is connected to a safety member, and the first sensor is connected between the load sensing circuit and the safety member of the power supply circuit.

4. The ventilator having an abnormal operation indication device in accordance with claim 1, wherein the power supply circuit is connected to a voltage drop circuit, so as to convert the alternating current power of the power supply circuit into a direct current power supply.

5. The ventilator having an abnormal operation indication device in accordance with claim 1, wherein the central processing unit is connected to a panel push button circuit, so that the central processing unit is controlled by the panel push button circuit.

6. The ventilator having an abnormal operation indication device in accordance with claim 1, wherein the central processing unit is electrically connected to the power supply circuit.

7. The ventilator having an abnormal operation indication device in accordance with claim 1, wherein the central processing unit controls operation of the fan motor.

8. The ventilator having an abnormal operation indication device in accordance with claim 1, wherein the central processing unit is connected to the illumination lamp.

9. The ventilator having an abnormal operation indication device in accordance with claim 1, wherein the ventilator has a panel provided with a plurality of abnormal operation indication lamps.

10. The ventilator having an abnormal operation indication device in accordance with claim 9, wherein the abnormal operation indication lamps of the ventilator are provided with different patterns.

11. The ventilator having an abnormal operation indication device in accordance with claim 9, wherein the abnormal operation indication lamps of the ventilator are provided with different figures.

* * * * *